(12) United States Patent
Guberman

(10) Patent No.: US 12,399,917 B2
(45) Date of Patent: Aug. 26, 2025

(54) METHODS AND APPARATUS FOR INTELLIGENT EDITING OF LEGAL DOCUMENTS USING RANKED TOKENS

(71) Applicant: Briefcatch, LLC, Arlington, VA (US)

(72) Inventor: Ross Guberman, Arlington, VA (US)

(*) Notice: Subject to any disclaimer, the term of this patent is extended or adjusted under 35 U.S.C. 154(b) by 0 days.

(21) Appl. No.: 18/437,325

(22) Filed: Feb. 9, 2024

(65) Prior Publication Data

US 2024/0184810 A1 Jun. 6, 2024

Related U.S. Application Data

(63) Continuation of application No. 17/943,345, filed on Sep. 13, 2022, now Pat. No. 11,954,135.

(51) Int. Cl.
| | |
|---|---|
| *G06F 16/31* | (2019.01) |
| *G06F 3/0484* | (2022.01) |
| *G06F 16/334* | (2025.01) |
| *G06F 40/166* | (2020.01) |
| *G06F 40/284* | (2020.01) |
| *G06Q 50/18* | (2012.01) |

(52) U.S. Cl.
CPC .......... *G06F 16/313* (2019.01); *G06F 3/0484* (2013.01); *G06F 16/334* (2019.01); *G06F 40/166* (2020.01); *G06F 40/284* (2020.01); *G06Q 50/18* (2013.01)

(58) Field of Classification Search
CPC .... G06F 16/313; G06F 16/334; G06F 40/284; G06F 40/166; G06F 3/0484; G06Q 50/18
See application file for complete search history.

(56) References Cited

U.S. PATENT DOCUMENTS

| | | |
|---|---|---|
| 8,209,278 B1 | 6/2012 | Straus |
| 8,666,742 B2 | 3/2014 | Detlef |
| 8,788,523 B2 | 7/2014 | Martin |
| 9,223,836 B1 | 12/2015 | Fletcher |
| 10,891,699 B2 | 1/2021 | Admon |

(Continued)

FOREIGN PATENT DOCUMENTS

WO 2019217999 11/2019

OTHER PUBLICATIONS

Turney et al. "From Frequency to Meaning: Vector Space Models of Semantics", Feb. 2010. (Year: 2010).*

(Continued)

*Primary Examiner* — Matthew J Ellis
(74) *Attorney, Agent, or Firm* — Wiggin and Dana LLP

(57) ABSTRACT

An apparatus for intelligent editing of legal documents is described. The memory instructs the processor to receive a rule. The memory instructs the processor to access a plurality of textual data. The memory instructs the processor to generate a list of tokens as a function of the rule and the plurality of textual data. The memory instructs the processor to generate one or more suggested alterations to the target text of the plurality of textual data as a function of the list of tokens. The memory instructs the processor to display the one or more suggested alterations to the target text of the plurality of textual data to a user. The memory instructs the processor to receive a user response to the at least one suggested alteration implementation. The memory instructs the processor to rank each token of the list of tokens as a function of the user response.

18 Claims, 6 Drawing Sheets

(56) References Cited

U.S. PATENT DOCUMENTS

| | | | |
|---|---|---|---|
| 11,181,988 B1* | 11/2021 | Bellegarda | G06F 3/04886 |
| 11,194,963 B1* | 12/2021 | Schafer | G06F 40/166 |
| 11,461,407 B1* | 10/2022 | Schafer | G06F 16/93 |
| 2013/0254126 A1* | 9/2013 | Koenig | G06F 40/169 |
| | | | 705/311 |
| 2015/0106078 A1* | 4/2015 | Chang | G06F 16/35 |
| | | | 704/9 |
| 2015/0154197 A1* | 6/2015 | Lightner | G06F 16/90324 |
| | | | 707/748 |
| 2015/0349888 A1 | 12/2015 | Chen et al. | |
| 2017/0060842 A1* | 3/2017 | Dwarakanath | G06F 40/30 |
| 2018/0253409 A1* | 9/2018 | Carlson | G06F 40/205 |
| 2018/0349472 A1* | 12/2018 | Kohlschuetter | G06F 16/3322 |
| 2019/0065456 A1 | 2/2019 | Platow | |
| 2019/0155916 A1* | 5/2019 | Huang | G06F 16/9535 |
| 2019/0179938 A1* | 6/2019 | Feuz | G06N 3/08 |
| 2019/0384762 A1* | 12/2019 | Hill | G06F 16/2272 |
| 2021/0149963 A1* | 5/2021 | Agarwal | G06F 16/90332 |
| 2021/0349888 A1* | 11/2021 | Barta | G06F 16/9535 |
| 2022/0019728 A1 | 1/2022 | Herr | |
| 2022/0100955 A1 | 3/2022 | Law | |

OTHER PUBLICATIONS

Kippa, https://www.klippa.com/en/ocr/legal-documents/, Feb. 13, 2020. (Year: 2020).*

* cited by examiner

METHODS AND APPARATUS FOR INTELLIGENT EDITING OF LEGAL DOCUMENTS USING RANKED TOKENS

CROSS-REFERENCE TO RELATED APPLICATIONS

This application is a continuation of Non-provisional application Ser. No. 17/943,345 filed on Sep. 13, 2022, and entitled "METHODS AND APPARATUS FOR INTELLIGENT EDITING OF LEGAL DOCUMENTS USING RANKED TOKENS," the entirety of which is incorporated herein by reference.

FIELD OF THE INVENTION

The present invention generally relates to the field of document editing. In particular, the present invention is directed to methods and apparatus for intelligent editing of legal documents using ranked tokens.

BACKGROUND

Autonomous editing of documents prepared by users can be useful in a number of circumstances. However, accurately and efficiently implementing such editing within legal documents may involve complexities and/or inconsistencies which may pose challenges.

SUMMARY OF THE DISCLOSURE

In an aspect, an apparatus for intelligent editing of legal documents is described. The memory instructs the processor to receive a rule. The memory instructs the processor to access a plurality of textual data. The memory instructs the processor to generate a list of tokens as a function of the rule and the plurality of textual data. The memory instructs the processor to classify one or more elements of textual data of the plurality of textual data to a document type using a document type classifier The memory instructs the processor to identify a target text of the plurality of textual data as a function of the classification. The memory instructs the processor to generate one or more suggested alterations to the target text of the plurality of textual data as a function of the list of tokens. The memory instructs the processor to display the one or more suggested alterations to the target text of the plurality of textual data to a user. The memory instructs the processor to receive a user response to the at least one suggested alteration implementation. The memory instructs the processor to rank each token of the list of tokens as a function of the user response. Ranking each token of the list of tokens comprises generating a first post-modification score of a first version of the plurality of textual data generated as a function of the user data. Ranking each token of the list of tokens comprises generating a second post-modification score associated with a second version of the plurality of textual data, wherein the second post-modification score is higher than the first post-modification score. Ranking each token of the list of tokens comprises iteratively training a ranking model using training data, wherein the training data comprises examples of plurality of textual data as inputs correlated to examples of post-modification scores as outputs, wherein the training data additionally comprises the second version of the plurality of textural data and the second post-modification score. Ranking each token of the list of tokens comprises ranking each token of the list of tokens as function of the user response using the trained ranking model.

In another aspect, a method for intelligent editing of legal documents is described. The method may include receiving, using at least a processor, a rule. The method includes accessing, using the at least a processor, a plurality of textual data. The method includes generating, using the at least a processor, a list of tokens as a function of the rule and the plurality of textual data. The method includes classifying, using the at least a processor, one or more elements of textual data of the plurality of textual data to a document type using a document type classifier. The method includes identifying, using the at least a processor, a target text of the plurality of textual data as a function of the classification. The method includes generating, using the at least a processor, one or more suggested alterations to the target text of the plurality of textual data as a function of the list of tokens. The method includes displaying, using the at least a processor, the one or more suggested alterations to the target text of the plurality of textual data to a user. The method includes receiving, using the at least a processor, a user response to the at least one suggested alteration implementation. The method includes ranking, using the at least a processor, each token of the list of tokens as a function of the user response. Ranking each token of the list of tokens comprises generating a first post-modification score of a first version of the plurality of textual data generated as a function of the user data. Ranking each token of the list of tokens comprises generating a second post-modification score associated with a second version of the plurality of textual data, wherein the second post-modification score is higher than the first post-modification score. Ranking each token of the list of tokens comprises iteratively training a ranking model using training data, wherein the training data comprises examples of plurality of textual data as inputs correlated to examples of post-modification scores as outputs, wherein the training data additionally comprises the second version of the plurality of textual data and the second post-modification score.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an apparatus and methods for intelligent editing of legal documents. In an embodiment, a natural language processing model analyzes user inputted legal text and suggests one or more modifications to the text. Aspects of the present disclosure can advantageously be used to efficiently and efficaciously to provide real-time suggestions to a user creating a legal document. Aspects of the present disclosure can desirably also be used to provide a reliable proofreading tool for a user creating a legal document. This may be accomplished by generating tokens a list of tokens as a function of a rule, ranking the tokens, and suggesting one or more alterations to a plurality of documents based at least on ranked tokens. Aspects of the present disclosure can advantageously also allow for reducing ambiguity and bias in documents being created by a user. Exemplary embodiments illustrating aspects of the present disclosure are described below in the context of several specific examples.

Figure 1:
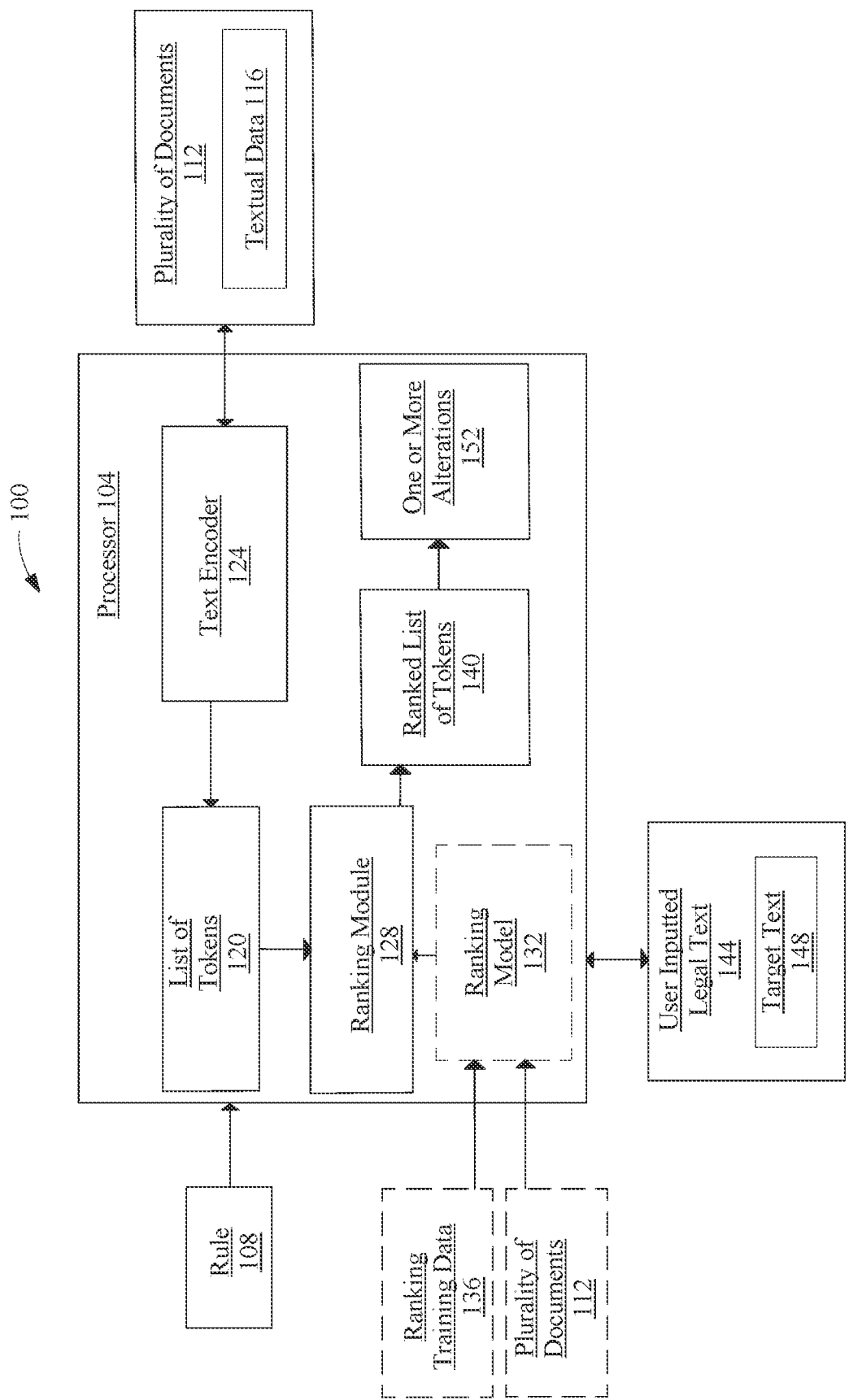
FIG. 1 is a block diagram of an exemplary embodiment of an apparatus for intelligent editing of legal documents.

Referring now to FIG. 1, an exemplary embodiment of an apparatus 100 for intelligent editing of legal documents is illustrated. Apparatus 100 may also be referred to as an apparatus for intelligent proofreading of legal documents. Apparatus 100 includes at least a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

Still referring to FIG. 1, apparatus 100 may include a computing device. The computing device may include a processor and a memory communicatively connected to processor, wherein memory contains instructions configuring processor to carry out the processing and generating process. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting an output of one device, component, or circuit to an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 receives at least a rule 108. Rule 108 may be received from a rule database or be manually input by a user. As used in this disclosure, a "rule" is language parameter that concerns grammatical issues or word choice issues. For example, a rule may concern, but is not limited to, unnecessarily wordy language, passive voice usage, excessive jargon usage, verb tenses, comma splices, double negatives, split infinitives, or the like. In some instances, a user may input one or more manual rules into a rule database for storage such that the user does not have to manually input a rule each time. In some embodiments, rule database may include a plurality of rules. In some instances, rule database may be uploaded from a publicly accessible domain. In addition, manually input rules may be added to a preexisting database. That is, a user created rule may be added to a rule database that already exists. For example, a preexisting rule database may include a rule that requires the use of an oxford comma. However, a manually input rule may require the deletion of an oxford comma. In instances where a manually input rule conflicts and/or contradicts a preexisting rule, the manually input rule may take priority. Further, in instances where a manually input rule does not conflict with a preexisting rule, both rules may have equal priority. Moreover, in instances where a manually input rule does not conflict with a preexisting rule, the preexisting rule may take priority. It should be noted that in all instances, a user may modify a priority of rules.

Continuing to refer to FIG. 1, rule 108 may be associated with grammar rules, word choice, punctuation, tone, persuasiveness, and the like. For example, rule 108 may concern word strength. That is, committal language such as "must," "is," "will," or language of the like may be stronger than "may" or "can". In some instances, it may be desirable to use stronger wording in a legal document. As such, rule 108 may be associated with replacing certain words with stronger language that makes sense within the context of a document. Additionally, rule 108 may be associated with word choice issues, such wordy language, excessive use of jargon, colloquialisms, word misuse, and the like. In some embodiments, rule 108 may be associated with grammatical rules, such as use of passive voice, incorrect verb tense, comma splices, double negatives, split-infinitives, or other various English language grammatical errors. It should be noted that rule 108 may a rule from any written language such as German, Hindi, Arabic, Hebrew, Japanese, Tagalog, and the like. Rule 108 may be received in any suitable format. As a nonlimiting example, in some embodiments, processor 104 may receive rule 108 as a set of pseudo-instructions. That is, rule 108 may serve as a set of instructions for processor 104 to carry out when analyzing a document, as discussed hereafter.

Still referring to FIG. 1, processor 104 may access a plurality of documents 112. In some embodiments, plurality of documents 112 may be stored remotely with respect to processor 104. However, it should be noted that plurality of documents 112 may be stored locally in a memory component or storage component of apparatus 100. Plurality of documents 112 may include textual data 116. As used in this disclosure, "textual data" is data including alphanumeric characters that may make up words, phrases, sentences, or the like. In some instances, textual data 116 may be in the form of character strings having one or more characters. In some embodiments, plurality of documents 112 and/or textual data 116 may be sourced from various sources including, but not limited to, Wikipedia, news articles, scholarly journals, and the like. In some embodiments, textual data 116 may be sourced from legal text sources including, but not limited to, legal briefs, judicial opinions, law review articles, legal opinion pieces, legal memoranda, and the like. In some instances, legal text sources may include Justia, Pacer Monitor, Lexis Nexis, Westlaw, HeinOnline, and the like. Further, as used in this disclosure, plurality of documents 112 may be referred to as "source documents." Additionally, textual data 116 may be sourced from the above-mentioned sources. Moreover, plurality of documents 112 and/or textual data 116 may be retrieved from a database.

Still referring to FIG. 1, a database, as used in this disclosure, may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, plurality of documents 112 may be encoded. As used in this disclosure, "encoding" is a process of converting human-readable text into a number/vector format. for a non-limiting example, plurality of documents 112 may already be broken down into tokens 120 when they are accessed based at least on rule 108. The term "token," as used in the present disclosure, refers to any smaller, individual groupings of text from a larger source of text; tokens may be broken up by word, pair of words, sentence, or other delimitation. For example, a token may be a prefix of a suffix of a word. Additionally or alternatively, accessing plurality of documents 112 may include using a text encoder 124 to extract text features from plurality of documents 112. As used in this disclosure, "text encoder" is a module used to encode textual data. As non-limiting examples, a text encoder may encode textual data using methods including, but not limited to, index-based encoding, bag of words (BOW), TF-IDF encoding, word2vector encoding, BERT encoding, or the like. Text encoder 124 may tokenize each document of the plurality of documents 112. As used in this disclosure, "tokenization" is splitting a phrase, sentence, paragraph, or an entire text of a document into smaller units, such as individual words or terms. Text encoder 124 may perform tokenization that may include word tokenization, where each word in each document of the plurality of documents 112 may become a token 120. In some embodiments, text encoder 124 may perform tokenization that may include character tokenization where each character in each document of the plurality of documents 112 may become a character. In some embodiments, text encoder 120 may perform tokenization that may include n-gram tokenization where n-gram tokenization may include splitting sentences into tokens 120 of "n" characters. For example, using bigrams would result in tokens 120 with a character length of two. Further, using trigrams would result in tokens 120 with a character length of three, and so on. In some embodiments, optical character recognition (OCR) may be employed to process plurality of documents 112.

Continuing to refer to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2 and 3.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Continuing the above discussion of FIG. 1, processor 104 may create a list of tokens 120 as a function of the rule 108. In some embodiments, text encoder 124 may tokenize textual data 116 of the plurality of documents 112 as a function of rule 108. For example, creating a list of tokens 120 may include identifying tokens 120 in plurality of documents 112 that rule 108 may be applicable to. In some embodiments, creating a list of tokens 120 may include identifying n-grams in the plurality of documents 112 that rule 108 may apply to. As a nonlimiting example, rule 108 may be to correct split infinitives, which is when an adverb separates the word "to" and an infinitive (e.g., to really like, to suddenly go, to quickly read). As such, text encoder 124 may tokenize textual data 116 by finding instances of the word "to" and identifying surrounding words as adverbs. Instances of phrases with "to" and then an adverb may indicate a token 120. It should be noted that text encoder 124 may tokenize each document of the plurality of documents 112. As such, a list of tokens 120 may be generated. In some embodiments, a list of tokens 120 may refer to a list of tokens 120 based at least on rule 108 being applied to the same document. In some embodiments, a list of tokens 120 may be referring to tokens 120 from more than one document of the plurality of documents 112.

Still referring to FIG. 1, processor 104 may rank list of tokens 120 to produce a ranked list of tokens 140. Ranking list of tokens 120 may include ranking as a function of a frequency of occurrence. A frequency of occurrence may be a number of times a specific token 120 occurs within a list of tokens 120 as described above. In some embodiments, the frequency of occurrence may be the number of times that a token appears in a document of the plurality of documents 112. In some embodiments, the frequency of occurrence may be the number of times that a token appears in the plurality of documents 112. In some embodiments, the list of tokens 120 may only list each token once. In these embodiments, the list of tokens 120 may include a frequency of occurrence associated with each token 120 in the list of tokens 120. In some embodiments, frequency of occurrence may be a number of times a specific token occurs within a single document. In some embodiments, frequency of occurrence may be a number of times a specific token occurs with the plurality of documents 112.

Still referring to FIG. 1, processor 104 may perform determinations, classification, and/or analysis steps, methods, processes, or the like as described in this disclosure using machine-learning processes. As discussed further below, a "machine-learning process," as used in this disclosure, is a process that automatically uses a body of data known as "training data" and/or a "training set" to generate an algorithm that will be performed by a computing device/module to produce outputs given data provided as inputs. As also discussed further below, "training data," as used in this disclosure, is data containing correlations that a machine-learning process may use to model relationships between two or more categories of data elements.

With continued reference to FIG. 1, machine-learning processes as described in this disclosure may be used to generate machine-learning models. As discussed further below, as used in this disclosure, a "machine-learning model" is a mathematical representation of a relationship between inputs and outputs, as generated using any machine-learning process including without limitation any process as described herein, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. In some embodiments, a machine-learning model (or artificial intelligence model) may include a natural language processing model. In an embodiment, natural language processing model may include neural networks or neural net algorithms, including convolutional neural networks or convolutional neural net processes.

Still referring to FIG. 1, in some embodiments, processor 104 may include a ranking module 128. Ranking module 128 may include any hardware and/or software module. In some embodiments, ranking module 128 may be configured to extract, from one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described in the present disclosure. Textual data may be parsed into tokens, which may include a simple word (sequence of letters separated by whitespace) or more generally a sequence of characters as described previously. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, ranking module 128 may operate to produce a ranking model such as, in one embodiment, ranking model 132. Ranking model 132 may include a program automatically generated by processor 104 and/or ranking module 128 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, processor 104 may generate ranking model 132 by any suitable method, including without limitation a natural language processing classification algorithm; ranking model 132 may include a natural language processing classification model that enumerates and/or derives statistical relationships between input terms and output terms. Algorithm to generate ranking model 132 may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used in the present disclosure, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 108 may combine two or more approaches. For instance, and without limitation, machine-learning program (and/or language processing program) may use a combination of Naive-Bayes (NB), Stochastic Gradient Descent (SGD), and parameter grid-searching classification techniques; the result may include a classification algorithm that returns ranked associations.

Continuing to refer to FIG. 1, generating ranking model 132 may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element, as described above and herein, may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment, associating language elements to one another, as described above and herein, may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, ranking module 128 may use a corpus of documents (e.g. legal source texts from legal sources) to generate associations between language elements in a ranking module, and the module (and/or a ranking model) may then use such associations to analyze words extracted from one or more documents and determine that the one or more documents indicate significance of a category. In an embodiment, ranking module 128 and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. The significant documents may be, in some embodiments, plurality of documents 112. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, language processing module may automatically obtain the document using such an identifier, for instance by submitting a request to a database or compendium of documents such as JSTOR as provided by Ithaka Harbors, Inc. of New York.

Still referring to FIG. 1, in some embodiments, processor 104 is configured to generate a score for each of the accessed plurality of documents 112. In some embodiments, plurality of documents 112 may be provided from various sources. It should be noted that legal documents, scholarly journals, articles, and the like, may serve as plurality of documents 112. Score may include, for example, a numerical value, a range, a ranking, a grade, a categorization, a classification, and the like, among others. A document type classifier may be used to classify plurality of source documents 112 according to their document type, and score may be generated for legal source texts falling within each document type classification. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample—features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Document classifier may classify documents to one or more types and/or category of legal source and/or document, which may include any type of legal source, sub-categories and/or more specific categories, or the like. For instance, document classifier may identify a document type as a brief to be presented at a court, and/or may further classify according to type of court such as an administrative court, a district or trial court, an appellate court, an appellate court of last resort, or the like, type of brief such as summary judgment brief, reply brief, appellate brief, or the like, and/or a party position of an author of the brief such as a plaintiff, defendant, appellant, appellee, petitioner, or the like. Document classifier may be trained using training data correlating legal sources to labeled document types. In an embodiment, document classifier may be able to determine what document type a partially completed legal document belongs to.

Further referring to FIG. 1, scores may be calculated per document category and/or source type category, for instance and without limitation as determined by a document classifier and/or legal source classifier. In other words, and as a non-limiting example, a first set of scores and/or scoring algorithm may be applicable to a first category of documents, such as appellate briefs, and a second set of scores and/or scoring algorithm may be applicable to a second category of documents, such as legal opinions. Persons skilled in the art, upon reviewing the entirety of this disclosure, will be aware of various additional categories of documents which may have their own scoring algorithms consistently with this disclosure.

Still referring to FIG. 1, in an embodiment, a score for each document of a plurality of documents 112 may be generated as a function of a machine-learning process. In an embodiment, score for each document of a plurality of documents 112 may be generated using regression analysis. Regression analysis may include any regression analysis technique including those disclosed in the present disclosure.

Still referring to FIG. 1, categorization or grouping of plurality of documents 112 may be used for scoring of these source texts. Plurality of documents 112 may be classified to categories within one or more categorizations, for instance and without limitation using document type classifier. Scores may then be computed within categories, for example and without limitation, score calculations for appellate briefs could be done within just the set of appellate briefs.

Continuing to refer to FIG. 1, in an embodiment, score for each document of plurality of documents 112 may be generated as a function of at least an identity of a corresponding legal source. For example, and without limitation, legal text from a Supreme Court website may be assigned a higher score compared to legal text from a lower court. In another example, and again without limitation, legal text from one country's official intellectual property website may be assigned a higher score compared to legal text from another country's official intellectual property website. A source type classifier may be used to classify score and/or compare source documents from the same source type. For example, and without limitation, source documents from court sources may be compared to one another for purposes of scoring, and not with CJS (an encyclopedia of United States law at the federal and state levels) entries or restatements. In some cases, authors and/or publishers may also be classified and scored to determine effect on legal source text (or other document) score. Source text classifier may be trained and/or generated in any manner suitable for training and/or generating document type classifier above. In an embodiment, scoring calculation methods for scoring legal documents as described in further detail below may be performed within particular categories of source text to which source text classifier is configured to classify source texts.

With continued reference to FIG. 1, in an embodiment, score for each document of plurality of documents 112 may be generated as a function of at least a value entered by an expert. Expert may include, for example and without limitation, a respected or senior judge, a respected or senior lawyer, a respected or senior law or English professor, a respected or senior legal researcher, and the like, among others. An expert type classifier may be used to classify, score and/or compare different types of experts. For example, expert type classifier may classify a first expert as a judge, a second expert as an academic such as a professor, law student, or the like, a lawyer, a representative of an executive department, a legislator, or the like. Expert type classifier may be trained by training examples correlating identifying information of experts to types of experts as identified by users. Expert type classifier may be trained using any classification algorithm suitable for use in training document type classifier.

In some embodiments, an effect of an expert input on a document score may be weighted by an expert score. An expert score may be generated by rating experts, where rating may be performed, without limitation, by aggregating ratings from peer experts, by polling the legal community, by polling practitioners within an area of practice in which a given expert purports to possess expertise, or the like.

Still referring to FIG. 1, in some embodiments, processor 104 may be configured to train ranking model 132 as a function of scored source documents and first a machine-learning process. In some embodiments, scored source documents may contain scored documents consistent with the documents in plurality of documents 112. First machine-learning process may include any of the machine-learning processes as disclosed in the present disclosure and described below with reference to at least FIG. 2, FIG. 3 and FIG. 4. Ranking model 132 may include any of the models disclosed in the present disclosure including those described above and described below with reference to at least FIG. 2, FIG. 3 and FIG. 4. These may include, without limitation, neural networks including convolutional neural networks and "feed-forward" networks. Ranking model 132 may be trained using a corpus of ranking training data 136. In some embodiments, ranking training data 136 may be historical data relating source documents to a score. As a non-limiting example, ranking training data 136 may contain scored source documents as described above. It should be noted that ranking model 132 may be trained to generate a score for each document of a plurality of documents 112. In response to receiving a score for each document of a plurality of documents 112 from ranking model 132, ranking module 128 may output a ranked list of tokens 140.

With continued reference to FIG. 1, in some embodiments, processor 104 and/or ranking module 128 may output ranked list of tokens 140. Ranked list of tokens 140 may contain the tokens from list of tokens 120 but ranked and/or reordered based on a criteria. Ranked list of tokens 140 may be ranked using any method disclosed in this disclosure. As a non-limiting example, the tokens in ranked list of tokens 140 may be ranked based on the frequency of occurrence of the tokens in plurality of documents 112. In some embodiments, the ranking based on frequency of occurrence may be weighted based on scores assigned to the plurality of documents 112. In some embodiments, an occurrence in a document with a high score may be weighted higher than an occurrence in a document with a low score. In some embodiments, an occurrence in a document with a high score may cause a token to be ranked higher, whereas an occurrence in a document with a low score may cause the token to be ranked lower.

Still referring to FIG. 1, in some embodiments, ranking model 132 may include a neural network that generates "embeddings" of a vector space which may be a collection of vectors, as described above and in the present disclosure including with reference to at least FIG. 3 and FIG. 4 below. Embedding and/or vectors may be used to find "similar" words, which could be scored according to suitability or efficacy based on plurality of documents 112. In other words, there may be another additional machine-learning process in addition to first machine-learning process that also trains ranking model 132—one to find word interrelationships based on plurality of documents 112, and the other to find appropriate or desirable word choices based on plurality of documents. In an embodiment, ranking model 132 may be specific to a document category which may be based on one or both of user inputted legal text 144 and/or plurality of documents 112. This may be referred to as "domain" categorization of NLP models for each domain. For instance, and without limitation, an NLP model may be generated per document type and/or per cluster within document type, for instance by training on a corpus of documents classified to a document type and/or cluster using document type classifier, source type classifier, and/or clustering algorithms as described in this disclosure.

Still referring to FIG. 1, in some embodiments, processor 104 may be configured to receive user inputted legal text 144 from a user device. For the purposes of this disclosure, "user inputted legal text" is a document of a user that contains textual data. User inputted legal text 144 may include any text entered by a user to create a document. User device may include, without limitation, any computing device as disclosed in the present disclosure including a personal computer, laptop, tablet, smartphone, or the like, among others. User may include any person such as, without limitation, a judge, a lawyer, a law practitioner, a paralegal, a legal academic, a professor, a law student, and the like, among others. In some embodiments, user may be outside of the legal profession, but may be writing on a legal topic; as non-limiting examples, user could be a privacy activist or human rights professor. In some instances, user inputted legal text 144 may be added to the plurality of documents 112 and processed as such. In some embodiments, user inputted legal text may be scored by ranking model 132. In some embodiment scored user inputted legal text may be stored and used as a component of ranking training data 136. User inputted legal text 144 may include any type of legal document, such without limitation, a decision, an opinion, a brief, a motion, a response, and the like. In some embodiments, user inputted legal text 144 may be received through one or more interactive elements of a graphical user interface (GUI). An "interactive element" as used in this disclosure is a portion of a display configured to receive user input. User input may include, without limitation, entry of one or more text-fields, clicking on buttons of a GUI, dragging and dropping one or more elements, and the like. In an embodiment, GUI may display one or more types of legal documents and prompt a user to select a category of legal document that a user is submitting. For instance, and without limitation, a legal document category may include but is not limited to an instrument, a pleading, a document, a contract, a deed, a business document, a settlement agreement, a motion, a brief, an appeal, and the like. In an embodiment, a legal document category may include one or more sub-categories. For instance, and without limitation, a legal document category such as a brief may include one or more sub-categories such as a reply brief, a merits brief, a writ of certiorari, an amicus curiae brief, a brief in opposition, and the like. In some embodiments, an interactive element may include a portion of a touchscreen of a GUI. A "touchscreen" as used in this disclosure is a display device capable of receiving user input through at least a portion of the display device. A touchscreen may include, but is not limited to, capacitive, projected capacitive, 5-wire resistive, and the like. User input may include one or more taps, swipes, scrolls, long presses, and the like, without limitation, of a touchscreen. A "graphical user interface" as used in this disclosure is a collection of graphics and/or icons representing one or more computer functions. A GUI may include one or more event handlers. An "event handler" as used in this disclosure is a program that is configured to perform a callback routine. Event handlers may be configured to detect user input and modify a portion of a GUI as a function of the detected user input. One of ordinary skill in the art, upon reading this disclosure, will appreciate the many ways and forms a GUI may be implemented.

Still referring to FIG. 1, in some embodiments, processor 104 is configured to access user inputted legal text 144. Analysis or assessment of user inputted legal text 144 may include, without limitation, analysis of sentence structure, including use of active and passive voice, as being created by a human user. Analysis of user inputted legal text 144, may include, without limitation, similarity of user sentences with those found in scored plurality of documents 112. In some cases, a heat map of legal source text and user sentences may be generated. As used in this disclosure, a "heat map" is a representation of data in the form of a map or diagram. For example, and without limitation, data values in a heat map may be represented as colors. A heat map may provide a data visualization technique that shows magnitude of a phenomenon as color in two dimensions. The variation in color may be by hue or intensity, giving visual cues about how the phenomenon is clustered or varies over space. A heat map may be provided to user so as to visualize potential alterations as they relate to user inputted legal text. Alternatively, or additionally, such a heat map may be internally utilized by processor 104 to facilitate operation of ranking module 128.

Still referring to FIG. 1, in some embodiments, processor 104 is configured to suggest one or more altercations, as a function of analysis of user inputted legal text 144 using ranked list of tokens 140 or user inputted legal text 144. An "alteration" for the purposes of this disclosure is a change to the text of a document. As non-limiting examples, an altercation may include punctuation changes, spelling corrections, word choice corrections, and the like. In an embodiment, processor 104 may suggest one or more alterations 152 to user inputted legal text 144. In an embodiment, suggesting one or more alterations 152 further includes classifying user inputted legal text 144 and plurality of documents 112 into a document type classification, and outputting one or more alterations 152 to user inputted legal text 144. In some cases, a heat map as mentioned above, may be used to provide one or more alterations 152.

Still referring to FIG. 1, identification of target texts 148 of user inputted legal text 144 may be performed using, without limitation, a classifier, which may be trained, without limitation, using user inputs labeling one or more strings of text as pertaining to one or more legal or other purposes; classifier may be trained in any manner suitable for training a classifier as described in this disclosure. As used in this disclosure, "target text" is a portion of a full legal document that is selected to be analyzed. As a non-limiting example, target text texts may be a word, a phrase, a paragraph, or the like. Alternatively or additionally, ranking module 128 may be configured to identify target texts, and/or to identify synonyms of user-identified target texts in training examples.

Classifiers and/or NLP models for identification of target texts may be specific to a cohort of similar types of documents to user-entered document, which may be selected, without limitation, using document classifier, legal source classifier, or the like. For instance, target text selection for wills and trusts may be different from target text selection for briefs, patent applications, or the like.

Still referring to FIG. 1, a document type classifier may be used to classify user inputted legal text 144. Any of the classification, categorization and grouping techniques as disclosed in the present disclosure may be used to classify user inputted legal text 144. For example, and without limitation, KNN and Naïve Bayes classifiers, as described above and herein, among other classifiers.

Still referring to FIG. 1, identification of target text 148 may be based on or a function of the document type classification for user inputted legal text 144. Identification of target texts 148 may also be based on or a function of on information gathered within a "cohort" of similar types of documents. For example, and without limitation, there could be different kinds of things to look for as target types within a first document type such as a will than in a second document type such as a Markman brief.

With continued reference to FIG. 1, target identification may initially include tokenization of document; this may precede classification to a document type in some embodiments, using tokenized document. Tokenization may include, without limitation, tokenization based on one or more elements of white space, one or more elements of punctuation, and/or one or more elements identifying phrases, sentences, words, paragraphs, or the like. Score generation may be performed using tokenized document, wherein tokenized elements may be input to scoring algorithm. Identification of target phrases and/or target text 148 may be performed with regard to tokenized elements. In some embodiments, identification of target phrases and/or target text 148 may be performed with regard to tokenized elements that are selected as a function of rule 108. As a non-limiting example, this may be done as disclosed above with reference to text encoder 124.

Still referring to FIG. 1, based on its analysis, ranking module 128 may suggest one or more alterations to target text 144, as needed. This analysis may be based, at least in part, on strength or score of each document of plurality of documents 112 in combination with machine-learning rules. In other words, analysis may be a function of scored plurality of documents 112 and machine-learning process 132. Suggested one or more alterations 152 to target text 148 may be outputted and/or displayed in a variety of manners on user device. For example, and without limitation, suggested one or more alterations 152 may be displayed in a text box, window, icon, or the like, among others. User may be alerted to suggested one or more alterations 152, for example and without limitation, by an audio alert, vibratory alert, visual alert, or the like, among others. One or more alterations 152 may be provided, as needed or desired. Suggested alterations 152 may be ranked and/or other explanatory notes to the suggested modifications may be provided. Target text 148 or text to which suggested one or more alterations 152 is directed to may be brought to user's attention by altering its appearance, for example and without limitation, by highlighting, bolding and/or underlining, or the like, among others.

Continuing to refer to FIG. 1, in an embodiment, processor 104 may be configured to output suggested alterations 152 to user device in real-time while human user is creating user legal document 148. In another embodiment, processor 104 may be configured to output suggested alterations 144 to a user device once human user has completed creating or modified user inputted legal text 144.

With continued reference to FIG. 1, in an embodiment, processor 104 may be configured to monitor user's response to suggested one or more alterations 152 to target text 148. This user data or information may be saved and used for diagnostic and training purposes, for example, to further refine ranking module 128. User data may be based on how user responds with respect to provided or suggestion modification(s) 152 and this information may be captured. For example, and without limitation, user data may include whether or not a suggested modification was implemented by user, whether or not a user ignored a suggested modification, whether user only partially implemented a suggested modification, and the like among others. User may have the ability to completely ignore, completely accept or partially accept suggested one or more alterations 152, as desired.

Still referring to FIG. 1, user inputted legal text 144 may include a final version which may have been generated after a series of modifications. For example, and without limitation, after each suggested modification is implemented, partially implemented or ignored, an updated a score may be generated. Such an iterative scoring process may be continued until user reaches a final version of user inputted legal text 144. A score during iterative process may be referred to as a post-modification score (or rank) until a final post-modification score (or rank) is assigned.

Still referring to FIG. 1, suggested alterations 152 may be ranked and this information presented to user. This may, for example and without limitation, allow user to prioritize the sequence of making potential changes or modifications to user inputted legal text 144 and/or pinpoint the most urgent modifications. In some cases, user may also be able to select target text 148 which user may be considering modifying to receive feedback on potential modifications. As a nonlimiting example, and without limitation, user may point out by highlighting a certain portion of text for which feedback is desired or needed.

Still referring to FIG. 1, in some embodiments, data mining may include the following sequence: Processor may generate scores for individual documents and/or individual target text elements; individual target text elements may be included in legal source documents, user inputted legal texts, and/or other documents. Where two documents are at a similar or identical score level, processor may substitute a higher scoring target text and/or target text element from a first document to replace a corresponding lower scoring target text and/or target text element in a second source document to modify that document. Processor may then calculate or compute a score for the modified document and check if the score has improved or not. These steps may be repeated or iterated until all higher scoring texts and/or higher scoring target text elements corresponding to target text elements in the document to be modified have been imported into modified document importation has shown no improvement to the score. This process may be performed within a document type category or classification. To address issues such as selection of document pairs and which of the documents is to be modified, further classification within a document type may be performed. For example, and without limitation, clustering algorithms such as a particle swarm optimization algorithm and/or k-means clustering algorithms may be used, among others, for further classification. The current document may be matched to a cluster, and then a mining, optimization cycle may be performed within the cluster, which may involve a large-scale genetic algorithm (i.e., pair off documents, do swapping, pick highest scoring documents to swap with each other ("elitism") but also randomly select other documents to swap with each other/elites—this may be kept up until difference in score improvement from one generation of elites to next is below a threshold amount). As a result, this would provide a new highest scoring document within a cluster of interest. This may be done across document types, or across cluster(s) for each cluster. In some cases, top scorers from clusters may compete with each other and/or cross pollination may be used to check if a higher score is achieved.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, processor may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\text{argmin}_{c_i \ni C} \text{dist}(c_i,x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

Figure 3:
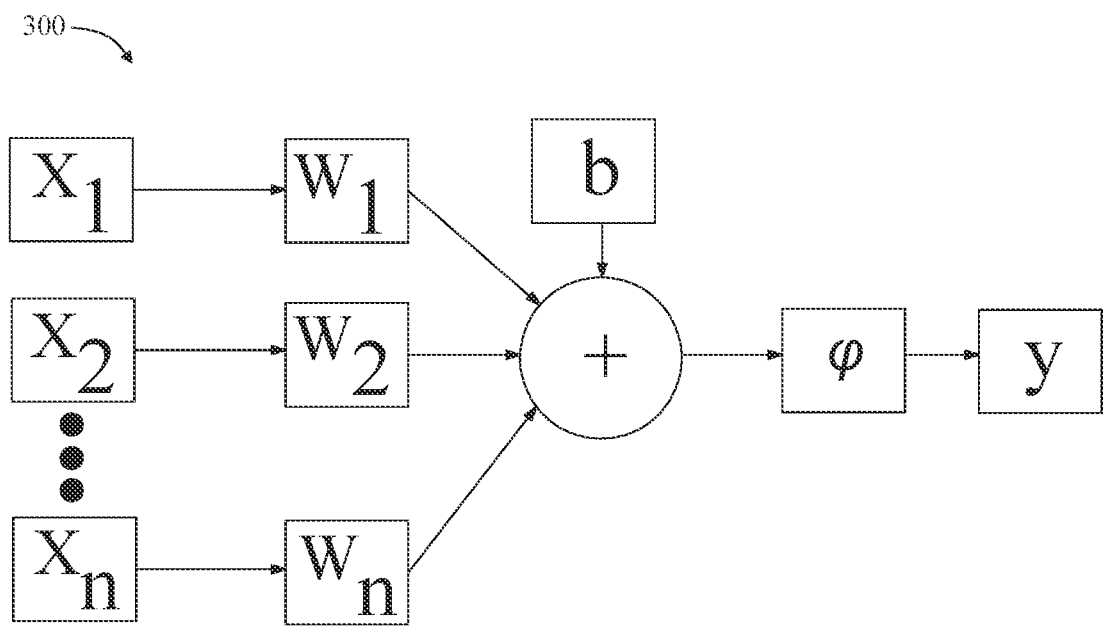
FIG. 3 is a block diagram of an exemplary embodiment of a node of a neural network.
Figure 4:
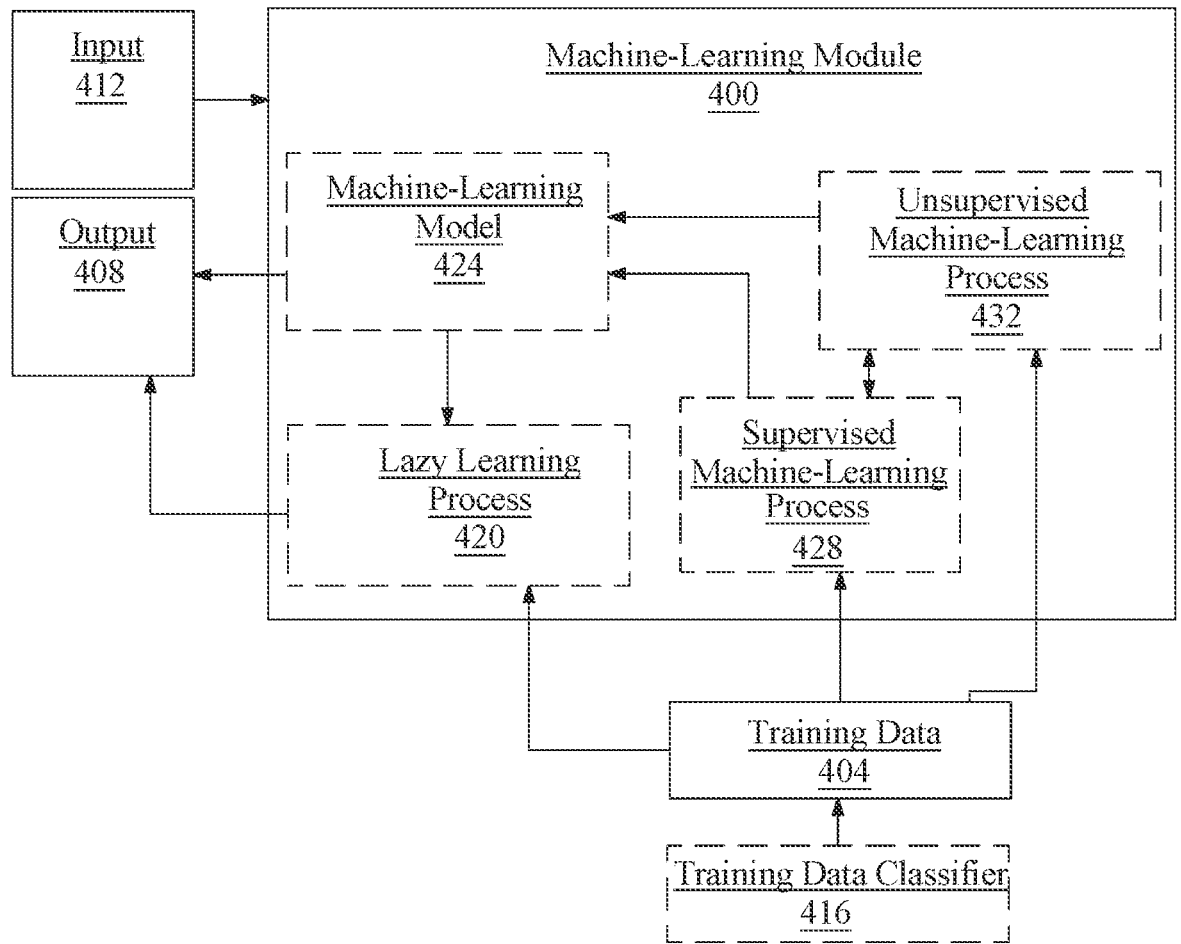
FIG. 4 is a block diagram of an exemplary embodiment of a machine-learning module.

Still referring to FIG. 1, in an embodiment, and additionally or alternatively to the vector space (embeddings) language processing disclosed above and in the present disclosure including at least in reference to FIG. 3 and FIG. 4, processor 104, ranking module 128 may be configured to analyze user inputted legal text 148 by utilizing speech tags. Speech tags may be used to identify similar words or groups of words in user inputted legal text 144 and plurality of documents 112. Speech tagging or part-of-speech (POS) tagging, sometimes also called grammatical tagging, may be considered to be a process of marking up a word in a text (corpus) as corresponding to a particular part of speech, based on both its definition and its context. POS tagging may be performed using algorithms which associate discrete terms, as well as hidden parts of speech, by a set of descriptive tags.

In some embodiments, one or more alterations 152 may include replacing one or more portions of user inputted legal text 144 with a highly ranked token 140. It should be noted that a ranking of tokens may be dependent on a ranking of plurality of documents 112. In an embodiment, tokens 120 may be identified from a document as a function of rule 108, and then the tokens 120 may be ranked as a function of a frequency of occurrence in plurality of documents 112. In some embodiments, a ranked token 140 may have a higher rank if it appears more in a highly scored document of plurality of documents 112. In some instances, a first ranked token 140 may appear in a highly ranked document of plurality of documents 112 and a second ranked token 140 may appear in a lower scored document of plurality of documents 112. As such, the first ranked token may be ranked higher than the second ranked token. As a non-limiting example, a first ranked token may appear more frequently in a higher ranked source document than a second ranked token. As such, the first ranked token may be ranked higher than the second ranked token. As another non-limiting example, a first ranked token may appear more frequently in a lower scored document of plurality of documents 112 than a second ranked token. In this example, the first ranked token may be ranked lower than the second ranked token. In an embodiment, the relationship between frequency of occurrence of tokens in higher ranked source documents and lower ranked source documents may be opposite of one another. A high frequency of a token in a higher ranked source document may imply a desirable token while a high frequency of a token in lower ranked source document may imply an undesirable or less desirable token. Further, one or more alterations 152 may be suggested as a function of the ranked list of tokens 140. Moreover, one or more alterations 152 may be implemented into a document based at least on the ranked list of tokens 140. In some embodiments, ranked tokens may be weighted. As a non-limiting example, an occurrence of a token in a highly scored document may receive a greater weight than an occurrence of token in a lower scored document. Thus, weighting of tokens may be used to rank tokens based on a number of occurrences, where each occurrence is assigned a different weight based on a score of a document.

In some embodiments, data may be extracted from ranked source documents. As a non-limiting example, a user may create a data list based on data drawn from ranked documents. User created list may include data that a particular user manipulates. Data may be any data as used in this disclosure. As a non-limiting example, data may include conclusions, based on a rule, drawn from a document. Data drawn from a document may be used to generate one or more tokens. In some embodiments, data drawn from a document may be used to rank one or more tokens. As a non-limiting example, data drawn from a document may include a list of tokens that a user may determine to be pertinent to a rule. Further, data drawn from a document may include a ranking of tokens based on a user ranking of tokens. In some embodiments, data drawn from a document may be input into processor 104 to generate one or more alterations 152.

In some embodiments, data drawn from documents may be input into processor 104 in place of plurality of documents 112. Once data drawn from documents is input into processor 104, processes described herein may be performed.

In some embodiments, one or more alterations 152 may be suggested as a function of surrounding character strings preceding and/or following a ranked token 140 in the plurality of documents 112. For the purposes of this disclosure, a "surrounding character string" is a plurality of characters that are adjacent to a token. As a non-limiting example, suggesting one or more alterations may include identifying the use of a ranked token in the ranked list of tokens 140 and comparing the proceeding and/or following words or tokens in the plurality of documents 112 to the proceeding and/or following word or token in user inputted legal text 144. As a nonlimiting example, a token may include "U.S." This may be commonly followed by "statute." Thus, if the user inputted legal text 144 contains the phrase "U.S. statue" an alteration may be suggested to replace this with "U.S. statute."

Still referring to FIG. 1, in modified embodiments, apparatus 100 may be used for intelligent editing (and/or proofreading) of documents other than legal documents. For example, and without limitation, other applications and uses of apparatus 100 may be directed to intelligent editing (and/or proofreading) of college admission applications, employment applications, resumes, and the like, essay competitions, and the like, among others.

Figure 2:
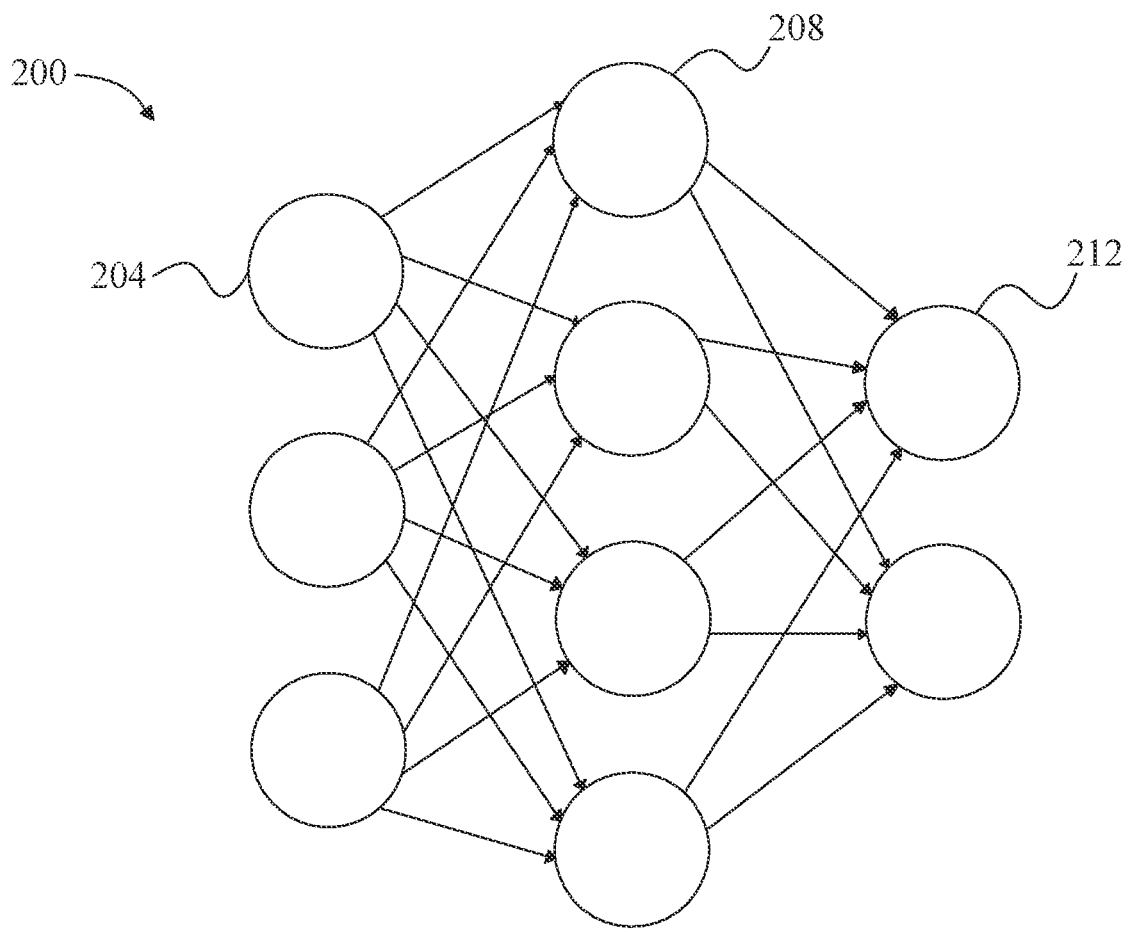
FIG. 2 is a block diagram of an exemplary embodiment of a neural network.

Referring now to FIG. 2, an exemplary embodiment of neural network 200 is illustrated. Any of the language processing models of the present disclosure, including ranking model 132 of FIG. 1, may include a neural network such as neural network 200. Neural network 200, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 204, one or more intermediate layers 208, and an output layer of nodes 212. Connections between nodes may be created via the process of "training" the network, in which elements from a training dataset are applied to the input nodes, and a suitable training algorithm (such as Levenberg-Marquardt, conjugate gradient, simulated annealing, or other algorithms) may then be used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Referring now to FIG. 3, an exemplary embodiment of a node 300 of a neural network is illustrated. Neural network my include neural network 200 of FIG. 2. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described herein and above. In some instances, a neural network may receive semantic units as inputs and output vectors representing such semantic units according to weights $w_i$ that are derived using machine-learning processes as described in this disclosure Referring now to FIG. 4, an exemplary embodiment of a machine-learning module 400 that may perform one or more machine-learning processes as described in this disclosure, including natural language processing, is illustrated. Machine-learning module may perform determinations, classification, and/or analysis steps, methods, processes, or the like as described in this disclosure using machine-learning processes. A "machine-learning process," as used in this disclosure, is a process that automatedly uses training data 404 to generate an algorithm that will be performed by a computing device/module to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include user inputted legal text 148 (see FIG. 1) and outputs may include suggested modification(s) 160 (see FIG. 1).

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to relate to a particular legal source 120, scores 124 as generated by experts, scores 124 as generated by regression analysis, scores 120 as based on legal source identity, and the like, among others.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user inputted legal text 148 as described above as inputs, suggested modification(s) 160 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
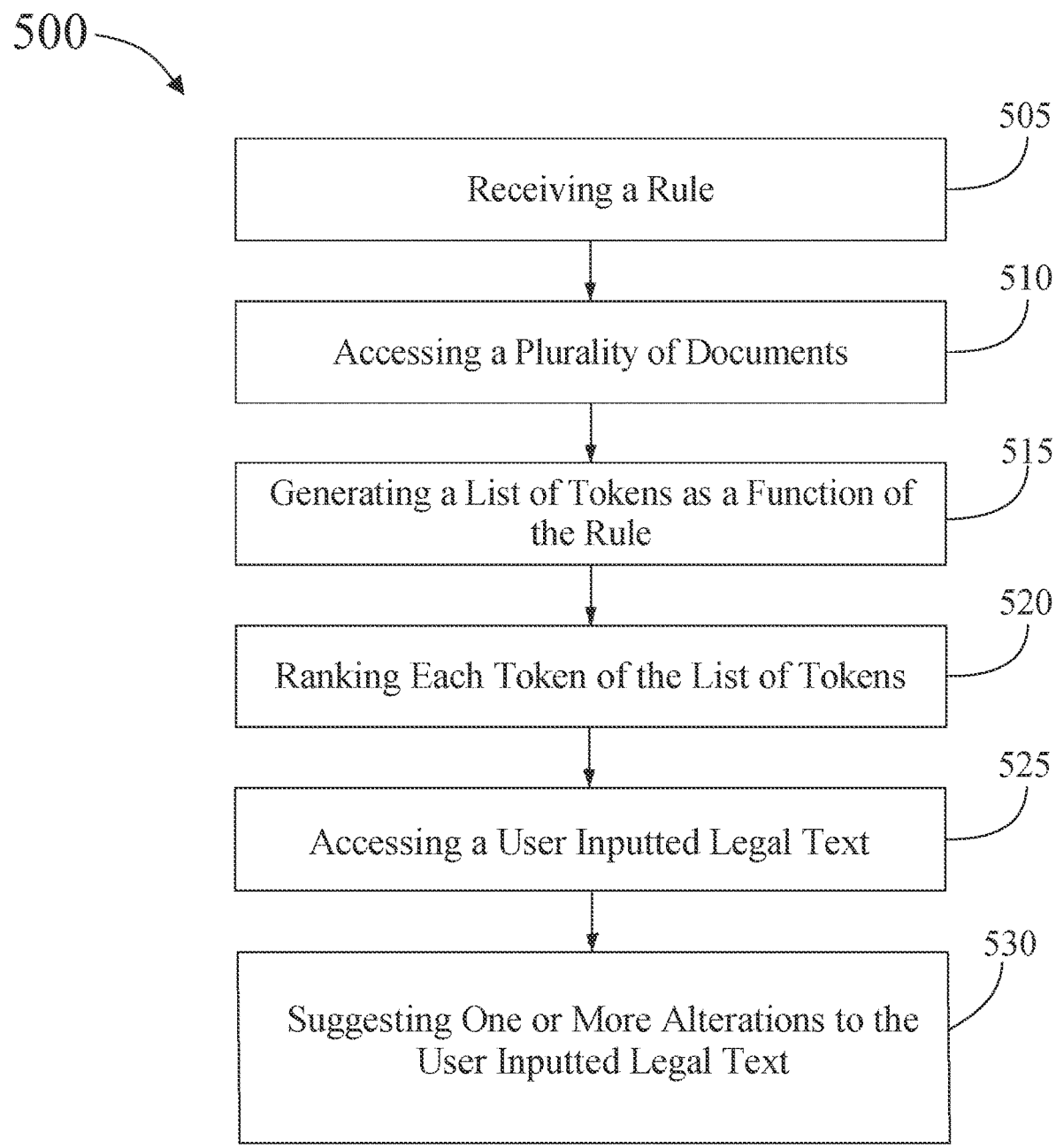
FIG. 5 is a block diagram of an exemplary embodiment of a method for intelligent editing of legal documents.

Now referring to FIG. 5, an exemplary embodiment of a method for intelligent editing of legal documents is illustrated. Intelligent editing may include any of the editing techniques as disclosed in the entirety of the present disclosure including those described above with reference to at least FIG. 1, FIG. 2, FIG. 3 and FIG. 4.

Still referring to FIG. 5, method 500 includes a step 505 of receiving, by a processor, a rule. This may be implemented as disclosed with reference to FIGS. 1-4 above.

Still referring to FIG. 5, method 500 includes a step 510 of accessing, by the processor, a plurality of documents. This may be implemented as disclosed with reference to FIGS. 1-4 above. In some embodiments, step 510 may include accessing a plurality of encoded documents. This may be implemented as disclosed with reference to FIGS. 1-4 above. In some embodiments, each document of the plurality of encoded documents may be tokenized.

Still referring to FIG. 5, method 500 includes a step 515 of generating, by the processor, a list of tokens as a function of the rule and the plurality of documents. This may be implemented as disclosed with reference to FIGS. 1-4 above. In some embodiments, step 515 may include extracting text features from the plurality of documents. This may be implemented as disclosed with reference to FIGS. 1-4 above. In some embodiments, extracting text features may further include identifying one or more tokens in the plurality of documents as a function of the rule. This may be implemented as disclosed with reference to FIGS. 1-4 above. In some embodiments, identifying one or more tokens in the plurality of documents as a function of the rule may include identifying n-grams in the plurality of the documents as function of the rule. This may be implemented as disclosed with reference to FIGS. 1-4 above.

With continued reference to FIG. 5, method 500 includes a step 520 of ranking, by the processor, each token of the list of tokens, wherein a ranking of each token is a function of a frequency of occurrence in the plurality of documents. This may be implemented as disclosed with reference to FIGS. 1-4 above. In some embodiments, step 520 may include identifying a first frequency of occurrence of each token in a first type of document and identifying a second frequency of occurrence of each token in a second type of document. This may be implemented as disclosed with reference to FIGS. 1-4 above.

With continued reference to FIG. 5, method 500 includes a step 525 of accessing, by the processor, a user inputted legal text. This may be implemented as disclosed with reference to FIGS. 1-4 above.

Still referring to FIG. 5, method 500 includes a step 530 of suggesting, by the processor, one or more alterations to the user inputted legal text as a function of the ranked list of tokens. This may be implemented as disclosed with reference to FIGS. 1-4 above. In some embodiments, step 530 may include comparing a first surrounding character string of a token of the ranked list of tokens to a target text, wherein the target text contains the token of the ranked list of tokens. This may be implemented as disclosed with reference to FIGS. 1-4 above. In some embodiments, step 530 may include suggesting the one or more altercations as a function of the comparison. This may be implemented as disclosed with reference to FIGS. 1-4 above. In some embodiments, step 530 may include suggesting the replacement of at least a portion of the target text with the first surrounding character string. This may be implemented as disclosed with reference to FIGS. 1-4 above.

Still referring to FIG. 5, in some embodiments, method 500 may include a step of comparing, by the processor, the first frequency of occurrence to the second frequency of occurrence. This may be implemented as disclosed with reference to FIGS. 1-4 above. In some embodiments, method 500 may include a step of ranking, by the processor, the list of tokens as a function of the comparison. This may be implemented as disclosed with reference to FIGS. 1-4 above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
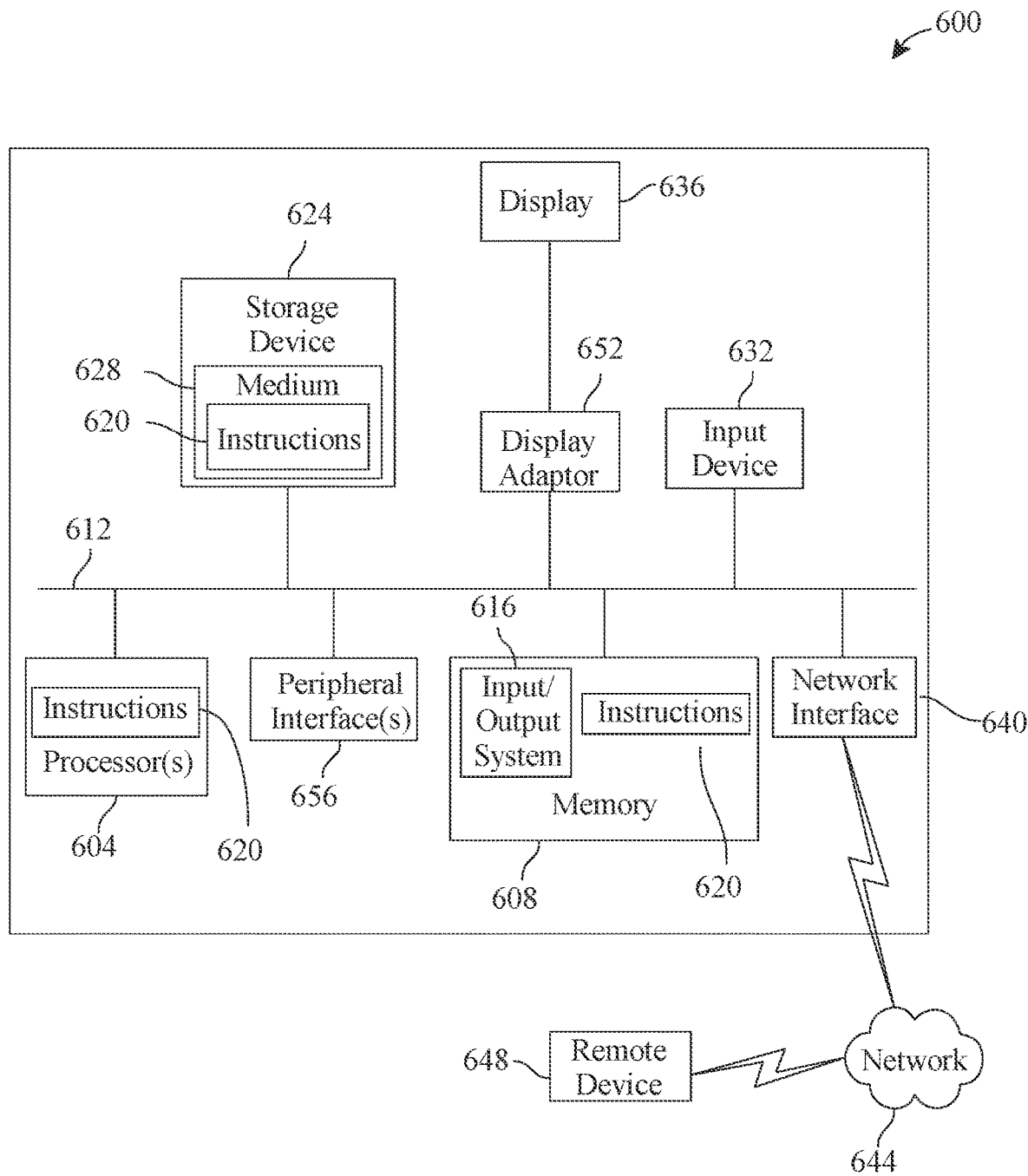
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and an apparatus according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for intelligent editing of legal documents, the apparatus comprising:
   at least a processor; and
   a memory communicatively connected to the at least a processor, wherein the memory contains instructions configuring the at least a processor to:
   receive a rule;
   receive a plurality of textual data using a graphical user interface (GUI), wherein the GUI comprises an interactive element configured to receive user input;
   generate a heat map of the received plurality of textual data wherein the heat map indicates potential alterations associated with the received plurality of textual data;
   display the heat map, through the GUI, to a user;
   generate a list of tokens as a function of the rule and the plurality of textual data using a generated ranking module, wherein the ranking module generated as a function of the heat map;
   classify one or more elements of textual data of the plurality of textual data to a document type using a document type classifier;
   identify a target text of the plurality of textual data as a function of the document type;
   generate one or more suggested alterations to the target text of the plurality of textual data as a function of the list of tokens;
   display the one or more suggested alterations to the target text of the plurality of textual data to a user;
   receive a user response to the one or more suggested alterations implementation; and
   rank each token of the list of tokens as a function of the user response, wherein ranking each token of the list of tokens comprises:
      generating a first post-modification score of a first version of the plurality of textual data generated as a function of the user response;
      generating a second post-modification score associated with a second version of the plurality of textual data, wherein the second post-modification score is higher than the first post-modification score;
      iteratively training a ranking model using training data, wherein the training data comprises examples of plurality of textual data as inputs correlated to examples of post-modification scores as outputs, wherein the training data additionally comprises the second version of the plurality of textual data and the second post-modification score; and
      ranking each token of the list of tokens as function of the user response using the trained ranking model.

2. The apparatus of claim 1, wherein accessing the plurality of textual data further comprises encoding the plurality of textual data.

3. The apparatus of claim 1, wherein classifying the one or more elements of textual data comprises classifying the one or more elements of textual data according to a legal source of the one or more elements of textual data.

4. The apparatus of claim 3, wherein identifying a target text of the plurality of textual data comprises:
  identifying a first set of target texts from the plurality of textual data; and
  identifying a second set of target texts as a function of the legal source of the one or more elements of textual data.

5. The apparatus of claim 1, wherein generating one or more suggested alterations comprises generating one or more suggested alterations as a function of a surrounding character string.

6. The apparatus of claim 5, wherein suggesting the one or more alterations further comprises suggesting a replacement of at least a portion of the target text with the surrounding character string.

7. The apparatus of claim 1, wherein generating the list of tokens further comprises extracting one or more textual features from the plurality of textual data.

8. The apparatus of claim 1, wherein generating the one or more suggested alterations comprises identifying one or more similar tokens to at least one token of the list of tokens as a function a frequency of appearance of the at least one token.

9. The apparatus of claim 1, wherein the rule comprises a tonal parameter of the plurality of textual data.

10. A method for intelligent editing of legal documents, the method comprising:
  receiving, using at least a processor, a rule;
  receiving, using the at least a processor, a plurality of textual data using a graphical user interface (GUI), wherein the GUI comprises an interactive element configured to receive user input;
  generating, using the at least a processor, a heat map of the received plurality of textual data wherein the heat map indicates potential alterations associated with the received plurality of textual data;
  display, using the GUI, the heat map to a user;
  generating, using the at least a processor, a list of tokens as a function of the rule and the plurality of textual data using a generated ranking module, wherein the ranking module generated as a function of the heat map;
  classifying, using the at least a processor, one or more elements of textual data of the plurality of textual data to a document type using a document type classifier;
  identifying, using the at least a processor, a target text of the plurality of textual data as a function of the document type;
  generating, using the at least a processor, one or more suggested alterations to the target text of the plurality of textual data as a function of the list of tokens;
  displaying, using the at least a processor, the one or more suggested alterations to the target text of the plurality of textual data to a user;
  receiving, using the at least a processor, a user response to the one or more suggested alterations implementation; and
  ranking, using the at least a processor, each token of the list of tokens as a function of the user response, wherein ranking each token of the list of tokens comprises:
    generating a first post-modification score of a first version of the plurality of textual data generated as a function of the user response;
    generating a second post-modification score associated with a second version of the plurality of textual data, wherein the second post-modification score is higher than the first post-modification score;
    iteratively training a ranking model using training data, wherein the training data comprises examples of plurality of textual data as inputs correlated to examples of post-modification scores as outputs, wherein the training data additionally comprises the second version of the plurality of textual data and the second post-modification score; and
    ranking each token of the list of tokens as function of the user response using the trained ranking model.

11. The method of claim 10, wherein accessing the plurality of textual data further comprises encoding the plurality of textual data.

12. The method of claim 10, wherein classifying the one or more elements of textual data comprises classifying the one or more elements of textual data according to an issuing body of the one or more elements of textual data.

13. The method of claim 12, wherein identifying a target text of the plurality of textual data comprises:
  identifying a first set of target texts from the plurality of textual data; and
  identifying a second set of target texts as a function of the issuing body of the one or more elements of textual data.

14. The method of claim 10, wherein generating one or more suggested alterations comprises generating one or more suggested alterations as a function of a surrounding character string.

15. The method of claim 14, wherein suggesting the one or more alterations further comprises suggesting a replacement of at least a portion of the target text with the surrounding character string.

16. The method of claim 10, wherein generating the list of tokens further comprises extracting one or more textual features from the plurality of textual data.

17. The method of claim 10, wherein generating the one or more suggested alterations comprises identifying one or more similar tokens to a token of the list of tokens as a function a frequency of appearance of the token.

18. The method of claim 10, wherein the rule comprises a tonal parameter of the plurality of textual data.

* * * * *